US012749392B2

(12) United States Patent
Song

(10) Patent No.: US 12,749,392 B2
(45) Date of Patent: Sep. 29, 2026

(54) METHOD OF CORRECTING ROUTE DATA RELATED TO TRAFFIC DEMAND AND DEVICE THEREFOR

(71) Applicant: ELECTRONICS AND TELECOMMUNICATIONS RESEARCH INSTITUTE, Daejeon (KR)

(72) Inventor: Hyewon Song, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 46 days.

(21) Appl. No.: 18/964,789

(22) Filed: Dec. 2, 2024

(65) Prior Publication Data

US 2025/0201112 A1 Jun. 19, 2025

(30) Foreign Application Priority Data

Dec. 13, 2023 (KR) ........................ 10-2023-0181056

(51) Int. Cl.
*G08G 1/01* (2006.01)

(52) U.S. Cl.
CPC ......... *G08G 1/0129* (2013.01); *G08G 1/0112* (2013.01); *G08G 1/0133* (2013.01); *G08G 1/0145* (2013.01)

(58) Field of Classification Search
None
See application file for complete search history.

(56) References Cited

U.S. PATENT DOCUMENTS

2023/0177845 A1* 6/2023 Lee ........................ G06V 10/82 382/103
2024/0369370 A1* 11/2024 Dai ...................... G08G 1/0141
2024/0419853 A1* 12/2024 Du .......................... G06F 30/15

FOREIGN PATENT DOCUMENTS

CN 110415517 A * 11/2019 ........... G08G 1/0133
CN 110986975 A * 4/2020 ............. G06Q 50/26
CN 107622665 B 6/2020
CN 106652444 B * 8/2021 ........... G08G 1/0125
CN 115565369 A * 1/2023 ........... G08G 1/0133
JP 2020-42628 A 3/2020
KR 10-0865939 B1 10/2008
KR 10-1703058 B1 2/2017
KR 10-2017-0073220 A 6/2017
(Continued)

OTHER PUBLICATIONS

Cheng et al., "Short-term traffic forecasting: An adaptive ST-KNN model that considers spatial heterogeneity", Computers, Environment and Urban Systems 71 (2018) 186-198 (Year: 2018).*
(Continued)

*Primary Examiner* — Amelia Vorce
(74) *Attorney, Agent, or Firm* — LRK PATENT LAW FIRM

(57) ABSTRACT

A method and apparatus for correcting traffic demand-related route data is disclosed. A spatiotemporal traffic flow pattern value is calculated. At least one route data is selected from a route data pool based on the spatiotemporal traffic flow pattern value. Traffic simulation is performed based on the selected route data. Whether to correct the spatiotemporal traffic flow pattern value is determined based on a result of the traffic simulation.

14 Claims, 7 Drawing Sheets

(56) References Cited

FOREIGN PATENT DOCUMENTS

| | | | | | |
|---|---|---|---|---|---|
| KR | 20220039537 | A | * | 3/2022 | G08G 1/0125 |
| WO | WO-2019165616 | A1 | * | 9/2019 | G08G 1/081 |

OTHER PUBLICATIONS

Duan et al., "Unified Spatio-Temporal Model for Short-Term Traffic Flow Prediction", IEEE Transactions on Intelligent Transportation Systems, vol. 20, No. 9, Sep. 2019 (Year: 2019).*

Xu et al., "Spatial-Temporal Transformer Networks for Traffic Flow Forecasting", arXiv:2001.02908v2 [eess.SP] Mar. 29, 2021 (Year: 2021).*

Xueying Song et al., "Dynamic Traffic Assignment Model Based on GPS Data and Point of Interest (POI) in Shanghai", Sensors 2021, 21, 7341. https://doi.org/10.3390/s21217341, Nov. 4, 2021.

* cited by examiner

METHOD OF CORRECTING ROUTE DATA RELATED TO TRAFFIC DEMAND AND DEVICE THEREFOR

CROSS-REFERENCE TO RELATED APPLICATION

This application claims priority to and the benefit of Korean Patent Application No. 10-2023-0181056, filed on Dec. 13, 2023, the disclosure of which is incorporated herein by reference in its entirety.

BACKGROUND

1. Technical Field

This invention relates to a method for calculating a realistic pattern (e.g., a traffic flow pattern based on actually observed traffic data) for a large-scale network such as a city and allocating and correcting pre-estimated traffic demand (e.g., origin-destination-based traffic volume) data according to a realistic pattern.

2. Description of Related Art

A variety of services are in operation that analyze/predict traffic situations and provide analysis/prediction results by utilizing traffic data collected from actual observation devices such as a detector, a radar, an image-based measurement/collection device, etc. In relation to the traffic simulation which is one of the above-described services, traffic demand data similar to reality among the input data used to implement a traffic simulation service is main input data for improving reliability for the value of traffic simulation.

In the past, traffic demand data was obtained by estimating it with traffic data previously collected in a limited area. Specifically, traffic demand data was estimated based on at least one of the movement patterns of people living in a target area or traffic data such as the traffic volume collected from traffic data collection devices located at limited spots. Recently, a method for estimating traffic demand data based on trajectory data which is traffic data collected from vehicles equipped with traffic data collectors.

SUMMARY

The present disclosure is to calculate spatiotemporal traffic flow patterns within a road network by utilizing public traffic data and private traffic data and provide traffic demand data (i.e., route data) suitable for traffic simulation which is part of a traffic prediction system based thereon.

The present disclosure is to provide a method for improving the accuracy of traffic demand data by comparing the results of traffic simulation with actually observed data.

The technical objects to be achieved by the present disclosure are not limited to the above-described technical objects, and other technical objects which are not described herein will be clearly understood by those skilled in the pertinent art from the following description.

A method for correcting traffic demand-related route data according to the present disclosure may include calculating a spatiotemporal traffic flow pattern value; selecting at least one route data from a route data pool based on the spatiotemporal traffic flow pattern value; performing traffic simulation based on the selected route data; and determining whether to correct the spatiotemporal traffic flow pattern value based on a result of the traffic simulation.

A device for correcting traffic demand-related route data according to an embodiment of the present disclosure may include a spatiotemporal traffic flow pattern value calculation unit for calculating a spatiotemporal traffic flow pattern value; a route data generation unit for selecting at least one route data from a route data pool based on the spatiotemporal traffic flow pattern value; and a traffic flow pattern value correction unit for performing traffic simulation based on the selected route data and determining whether to correct the spatiotemporal traffic flow pattern value based on a result of the traffic simulation.

In a method/a device for correcting traffic demand-related route data according to an embodiment of the present disclosure, the spatiotemporal traffic flow pattern value may be generated by spatially combining a temporal traffic flow pattern value for a traffic data collection spot.

In a method/a device for correcting traffic demand-related route data according to an embodiment of the present disclosure, the route data pool may include trajectory route data and road network-based route data and the road network-based route data may be obtained by applying an optimal route tracking algorithm to road network data.

In a method/a device for correcting traffic demand-related route data according to an embodiment of the present disclosure, final route data may be generated by allocating a vehicle departure time to the selected route data.

In a method/a device for correcting traffic demand-related route data according to an embodiment of the present disclosure, the vehicle departure time may be determined based on the spatiotemporal occurrence distribution of trajectory route data.

In a method/a device for correcting traffic demand-related route data according to an embodiment of the present disclosure, whether to correct the spatiotemporal traffic flow pattern value may be determined based on whether an error between a first traffic flow value at an actual observation spot obtained through the traffic simulation and a second traffic flow value actually observed at the actual observation spot is less than or equal to a target value.

In a method/a device for correcting traffic demand-related route data according to an embodiment of the present disclosure, when it is determined to correct the spatiotemporal traffic flow pattern value, information for correcting the spatiotemporal traffic flow pattern value may be fed back to a route data selection step.

In a method/a device for correcting traffic demand-related route data according to an embodiment of the present disclosure, the information may include at least one of a difference between the first traffic flow value and the second traffic flow value or a weight derived based on the difference.

In a method/a device for correcting traffic demand-related route data according to an embodiment of the present disclosure, the weight may be proportional to the difference.

In a method/a device for correcting traffic demand-related route data according to an embodiment of the present disclosure, when the difference is a negative value, the weight may be set to a value between 0 and 1 and when the difference is a positive value, the weight may be set to a value greater than 1.

In a method/a device for correcting traffic demand-related route data according to an embodiment of the present disclosure, the corrected spatiotemporal traffic flow pattern value may be derived by multiplying the spatiotemporal traffic flow pattern value by the weight.

In a method/a device for correcting traffic demand-related route data according to an embodiment of the present disclosure, the at least one route data may be selected by sampling route data from the route data pool based on a weight based on the spatiotemporal traffic flow pattern value.

The features briefly summarized above with respect to the present disclosure are just an exemplary aspect of a detailed description of the present disclosure described below, and do not limit a scope of the present disclosure.

DETAILED DESCRIPTION OF THE INVENTION

Figure 1:
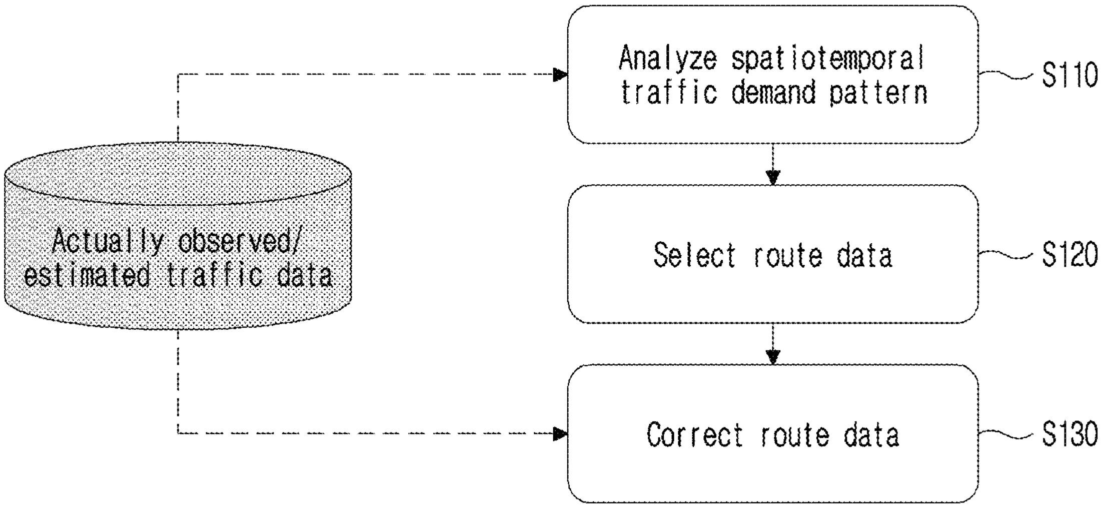
FIG. 1 is a flowchart of a method for generating and correcting traffic demand according to an embodiment of the present disclosure.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

FIG. 1 is a flowchart of a method for generating and correcting traffic demand according to an embodiment of the present disclosure.

According to the present disclosure, at least one of actually observed traffic data or estimated traffic data may be used to generate traffic demand. Actually observed traffic data may be collected from a heterogeneous traffic collection device such as a traffic data collection device located at spots for traffic demand analysis or a traffic data collection device attached to a moving vehicle. Actually observed traffic data may include at least one of section traffic volume, section speed or trajectory information.

Estimated traffic data is traffic data estimated based on a traffic status survey or a sample survey, etc. by a public institution, and includes traffic flow data between a start point and an end point (hereinafter, referred to as 'origin-destination').

In performing embodiments according to the present disclosure, actually observed/estimated traffic data may be past data that was pre-collected or estimated and stored.

According to the nature of a collection target, actually observed/estimated traffic data may be divided into public traffic data and private traffic data. Public traffic data may include information such as an origin-destination-based estimated traffic flow or a traffic flow by spot, etc. and private traffic data may include navigation-based route data.

Referring to FIG. 1, in order to generate traffic demand, a spatiotemporal traffic flow pattern value may be analyzed/calculated based on actually observed/estimated traffic data and a road network graph (S110). Once a spatiotemporal traffic flow pattern value is calculated, a calculated spatiotemporal traffic flow pattern value may be utilized to determine road network graph-based route data (S120). Afterwards, for determined route data, a correction step for improving the accuracy of a spot traffic flow may be performed by utilizing traffic simulation based on actually observed traffic data (e.g., a spot traffic flow) (S130). Meanwhile, a correction step (S130) may be repeatedly performed until the accuracy of a traffic flow by spot reaches a target value.

Hereinafter, each step is described in detail.

<Spatiotemporal Traffic Demand Pattern Analysis (S110)>

Figure 2:
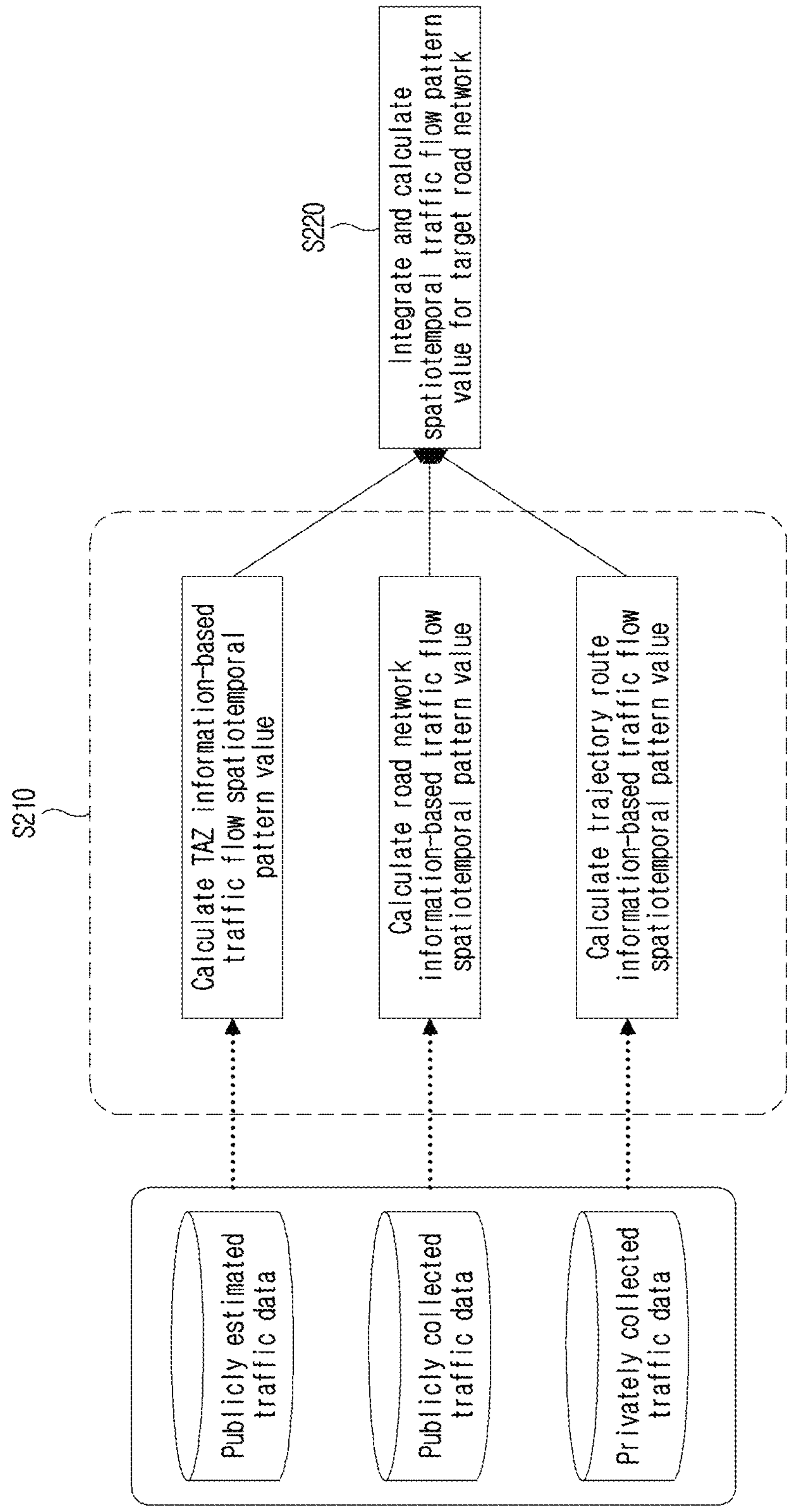
FIG. 2 shows detailed steps of a spatiotemporal traffic demand pattern analysis step.

FIG. 2 shows detailed steps of a spatiotemporal traffic demand pattern analysis step. Referring to FIG. 2, a spatiotemporal traffic demand pattern analysis step includes a step of calculating a temporal pattern value for each of a plurality of spots by utilizing actually observed/estimated traffic data (S210) and a step of calculating an integrated spatiotemporal traffic flow pattern value by applying each calculated temporal pattern to a target road network graph (S220).

As actually observed/estimated traffic data information for calculating a spatiotemporal pattern value, at least one of publicly estimated traffic data (e.g., traffic flow data by origin-destination), publicly collected traffic data (e.g., actually observed traffic flow data by spot) or privately collected traffic data (e.g., route data collected based on a mobile vehicle such as a navigation, etc.) may be utilized.

Meanwhile, each traffic data may be preprocessed by space and/or by time.

As an example, for spatial analysis of traffic data, analysis based on the concept of Traffic Analysis Zone (TAZ) may be performed. A spatial preprocessing process may be processed by visualizing a spatial graph between TAZs.

In addition, while traffic flow data by origin-destination, a type of estimated traffic data, is set to have a time unit for collected data which is greater than or equal to 1 hour, most collected traffic data has a time unit for collected data which is seconds or minutes. Accordingly, in a temporal preprocessing process, scale match processing may be performed to match a time unit between data.

In order to calculate a spatiotemporal traffic flow pattern value based on traffic flow data by origin-destination, the total traffic flow value by origin-destination may be calculated. In other words, based on traffic flow data by origin-destination, the total traffic flow value ($V_{target}$) may be calculated for a target road network range that is a target for traffic demand pattern calculation.

Meanwhile, there may be a traffic flow that only passes through a target road network range without a departure or arrival spot being included in a target road network range.

Accordingly, in calculating the total traffic flow value for a target road network range, it is also needed to consider a traffic flow that only passes through a target road network range. Equation 1 shows an example in which the total traffic flow value $V_{target}$ is calculated by considering a traffic flow that only passes through a target road network range (a passing traffic flow).

$$V_{target} = v_{start} + v_{end} + v_{internal} + v_{pass} \quad \text{Equation 1}$$

As illustrated in Equation 1 above, the total traffic flow value ($V_{target}$) may be calculated as the sum of a traffic flow value ($v_{start}$) that starts from a TAZ existing within a target road network range and moves to another TAZ (e.g. another TAZ existing within a publicly estimated traffic data range), a traffic flow value ($V_{end}$) that starts from another TAZ and arrives at a TAZ existing within a target road network range, a traffic flow value ($v_{internal}$) that moves between TAZs existing within a target road network range and a traffic flow value ($v_{pass}$) that passes through a target road network range among the traffic flows moving between other TAZs.

Figure 3:
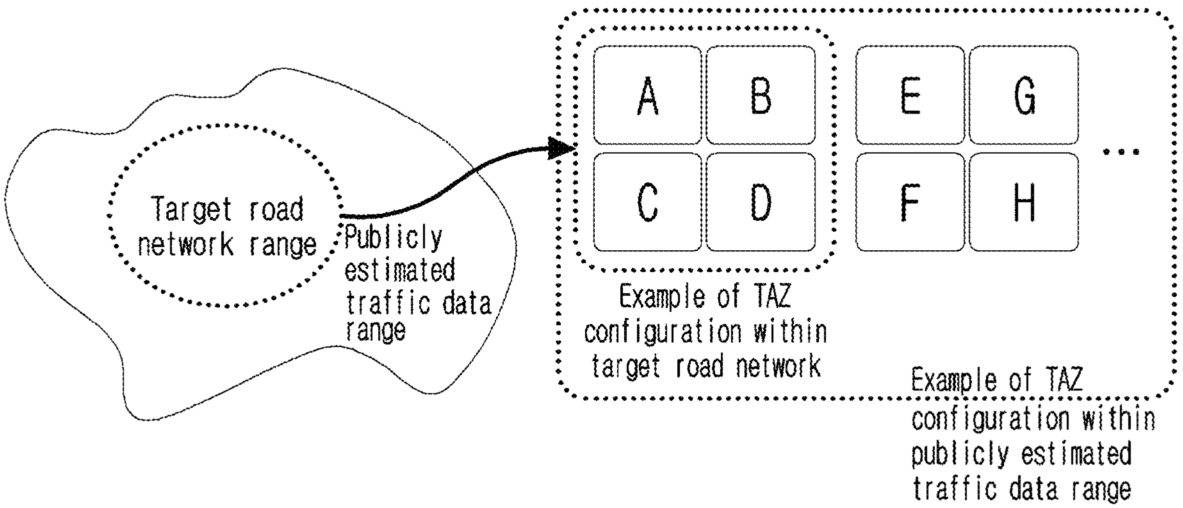
FIG. 3 shows an example in which a target road network range is included in a public estimated traffic data range.

Meanwhile, as in an example shown in FIG. 3, when a target road network range is included in an estimated traffic data range, a passing traffic flow value ($v_{pass}$) may be estimated according to Equation 2 below.

$$v_{pass} = \sum\nolimits_{i,j \in TAZ_{others}} \alpha \cdot v_{ij} \quad \text{Equation 2}$$

A passing traffic flow value ($v_{pass}$) may be calculated by considering a traffic flow value $v_{ij}$ from TAZ i to TAZ j and a rate of passing through a target road network range on a corresponding traffic flow according to geographical connection characteristics between TAZs. The rate may be reflected as a value of a, a variable shown in Equation 2. Meanwhile, a rate of passing a target road network range may be estimated in a spatial preprocessing process.

A temporal traffic flow pattern value may be calculated based on traffic data by time section. Equation 3 defines a temporal traffic flow pattern value in a formula.

$$w_t = \frac{V_t}{\sum\nolimits_{i \in TI} V_i},\ \sum\nolimits_{i \in TI} w_t = 1 \quad \text{Equation 3}$$

In Equation 3, $w_t$ represents a pattern value (i.e., a weight) for time t. t represents a specific time zone among the entire measurement time (e.g., 24 hours), and as an example, t may be data in a unit of 1 hour. Vt represents the total traffic volume for time t and Vi represents the traffic volume in the entire measurement time. As in an example shown in Equation 3, a pattern value $w_t$ for t hours may be derived by dividing the total traffic volume for t hours by the traffic volume Vi in the entire measurement time.

As a result, a temporal traffic flow pattern value for a specific spot may be represented as a 1D matrix including a pattern value (i.e., a weight) by unit time. As an example, when the entire time zone for which traffic flows are collected is 24 hours and a unit time zone is time TI, a temporal traffic flow pattern value may be represented as a 1D matrix (vector) in the form of 1×num(TI) or num(TI)×1. Here, num(TI) is the number of unit times at which a pattern value is calculated, and when TI is 1 hour, num(TI) may be 24.

Meanwhile, spots where a temporal traffic flow pattern value as above is calculated, i.e., spots where traffic data is collected, may be spatially scattered. Accordingly, a temporal traffic flow pattern value may be connected spatially to derive a 2D matrix (vector). Specifically, a temporal traffic flow pattern value may be connected spatially to derive a matrix in a size of num(TI)×num(SPOT) or num(SPOT)×num(TI). Here, num(SPOT) may represent the number of spots at which a temporal traffic flow pattern value is calculated.

In other words, spatially connecting a temporal traffic flow pattern value may be defined as a set of temporal traffic flow pattern value matrixes by spatial spot, as in an example of Equation 4.

$$\overline{w} = [\overline{w_{S_i}}],\ S_i \in SPOT \qquad \text{Equation 4}$$

Meanwhile, scale matching for a temporal traffic flow pattern value may be performed to combine a temporal traffic flow pattern value for a plurality of spots.

Meanwhile, a temporal traffic flow pattern value connected spatially may exist by OD pair, i.e., by origin-destination. In other words, a spatial pattern may be composed of an OD pair represented by a pair of a spot where the first traffic data is actually observed and the second TAZ. Accordingly, a three-dimensional matrix (vector) may be generated by combining a two-dimensional vector matrix by OD pair. In other words, a three-dimensional matrix (vector) such as num(OD Pair)×num(TI)×num(SPOT) may be generated by expanding a two-dimensional matrix that a temporal traffic flow pattern value is spatially combined by the number of origin-destination pairs. A three-dimensional matrix component as above may be called a spatiotemporal traffic flow pattern value.

Figure 4:
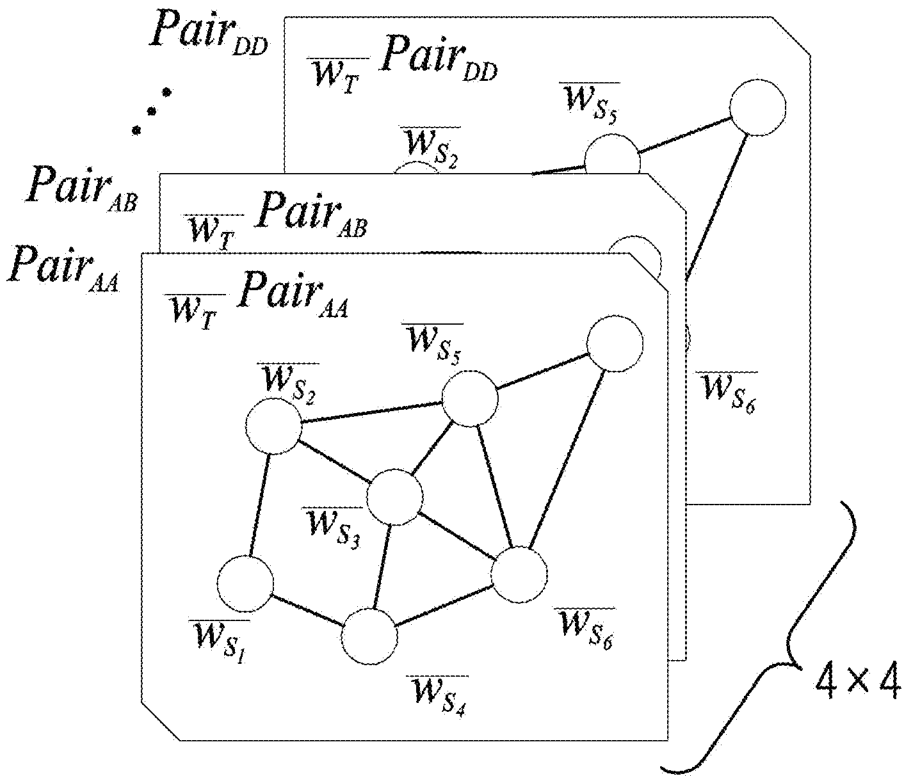
FIG. 4 schematizes a spatiotemporal traffic flow pattern value derived for a target road network range.

FIG. 4 schematizes an example in which a three-dimensional spatiotemporal traffic flow pattern value is derived for a target road network range.

As an example, it is assumed that the TAZ of a target road network is composed of A, B, C and D. In this case, a traffic flow pattern value matrix composed of vector components for spots where a temporal pattern value may be calculated (e.g., S1, S2, etc. in FIG. 4) may be derived from the temporal pattern of a target road network according to an origin-destination pair.

<A Step of Generating a Road Network Graph-Based Route by Using a Spatiotemporal Traffic Demand Pattern (S120)>

Figure 5:
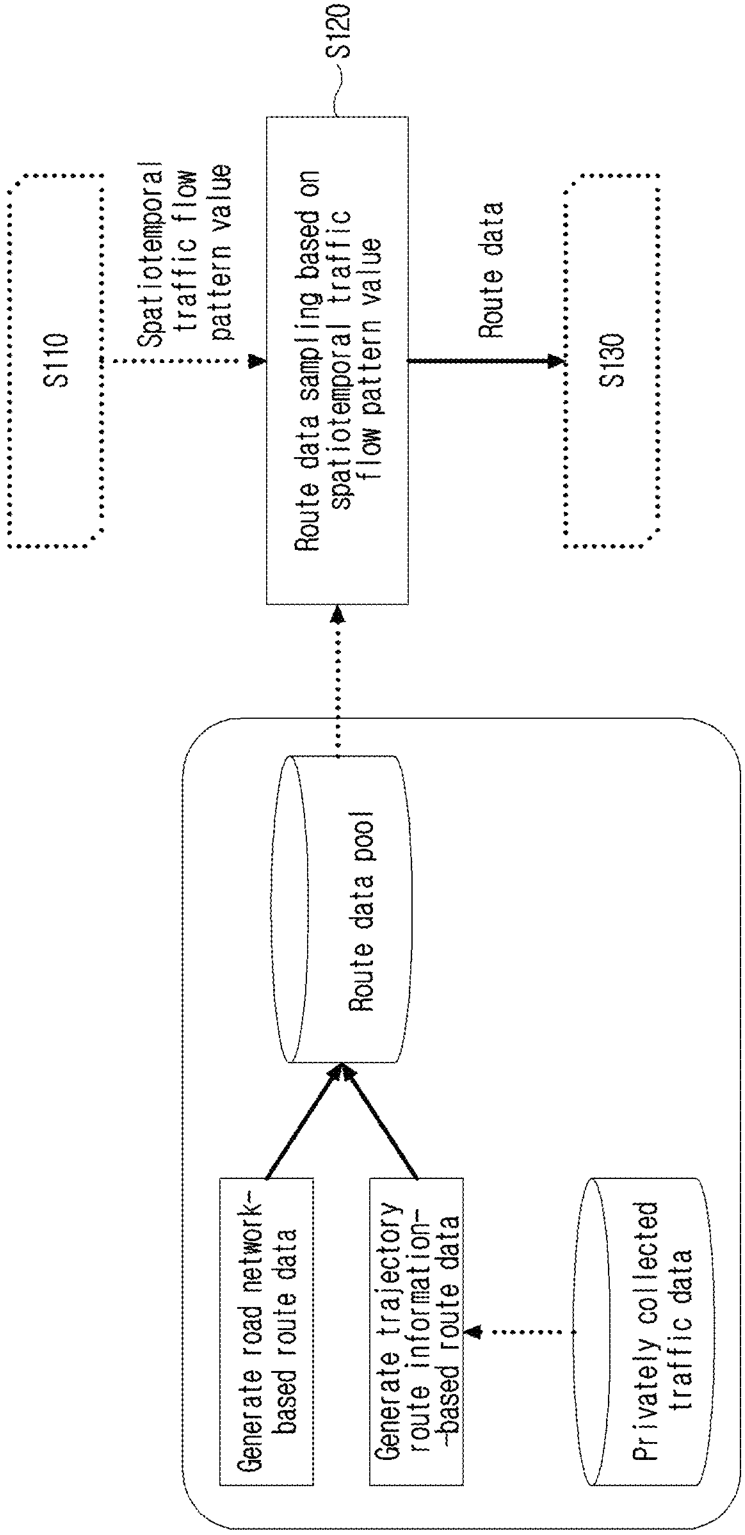
FIG. 5 illustrates a detailed operation of a step for generating a route based on a spatiotemporal traffic demand pattern-based road network graph.

FIG. 5 illustrates a detailed operation of a step for generating a route based on a spatiotemporal traffic demand pattern-based road network graph. Referring to FIG. 5, a step of generating a road network graph-based route by using a spatiotemporal traffic demand pattern may determine route data by sampling a route data pool based on a spatiotemporal traffic flow pattern value.

Meanwhile, a route data pool may be pre-constructed before performing this step.

Alternatively, during the process of performing this step, a route data pool may be actively generated.

A route data pool may be generated based on at least one of the result of generating/processing road network-based route data and the result of generating/processing pre-collected trajectory route information-based route data.

Specifically, trajectory route data corresponds to private traffic collection data among the pre-collected traffic data. For trajectory route data, transform processing may be performed in a data format for a temporal route data pool.

Meanwhile, based on trajectory route information, considering a difficulty in fully reflecting route data (i.e., reflecting the entire traffic demand volume within an actual road network), route data generated by applying a route generation algorithm to a target road network, i.e., road network-based route data, may be additionally stored in a route data pool. Specifically, route data generated by applying a route generation algorithm to pre-acquired road network data may be added to a route data pool separately from trajectory route data. Here, a route generation algorithm may include at least one of a shortest path calculation algorithm or a shortest time path calculation algorithm.

Route data stored in a route data pool may be provided as link sequence information of road network data. In addition, route data may be stored by being classified into the same category as a spatiotemporal traffic flow pattern in the previous step (S110).

A spatiotemporal traffic flow pattern value may be utilized as weight information to select route data through weighted random sampling from a route data pool. In this case, the number of route data selected may be the same as the number of vehicles for which route data generation is requested by origin-destination within a given time interval. Specifically, route data may be selected as much as the traffic flow volume by origin-destination within a given time.

The generation of route data may be completed by allocating the departure time of a vehicle running according to selected route data. In this case, the departure time of a vehicle may be generated according to a probability distribution (Poisson Distribution). Meanwhile, instead of determining a vehicle departure time by a probability distribution, a vehicle departure time may be estimated/predicted through artificial intelligence based on the spatiotemporal occurrence distribution of trajectory route data which is pre-collected data.

Meanwhile, route data may be generated according to a traffic simulation input data format.

<A Step of Correcting an Actually Observed Traffic Data-Based Result (S130)>

Figure 6:
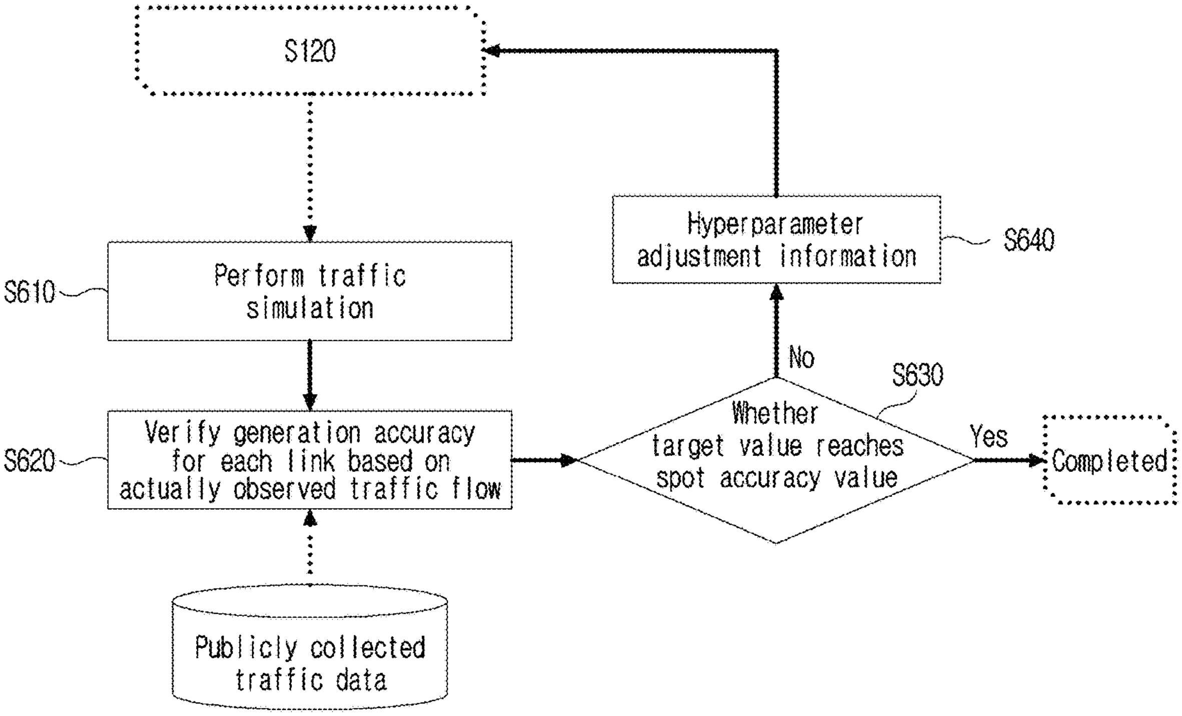
FIG. 6 shows detailed steps of a step for correcting an actually observed traffic data-based result.

FIG. 6 shows detailed steps of a step for correcting an actually observed traffic data-based result. Referring to FIG. 6, a step of correcting an actually observed traffic data-based result may include a step (S610) of performing traffic simulation based on at least one route data selected in the previous step (S120), a step (S620) of verifying accuracy by spot based on actually observed traffic flow data which is pre-collected by spot, a step (S630) of confirming whether accuracy for a spot reaches a target value and a step (S640) of giving feedback on information for a hyperparameter to the previous step (S120) when accuracy does not reach a target value. When generation accuracy for a spot reaches a target value, selected route data may be confirmed as final route data.

Route data selected in the previous step is utilized as input data for traffic simulation to perform traffic simulation. Among the results obtained through traffic simulation, a result value at a spot where actual observation is possible is extracted, and an extracted result value is compared with an actually observed traffic flow at an actual observation spot to calculate an error value between the two (e.g. MAPE: Mean Absolute Percentage Error). Accuracy at a corresponding spot may be verified based on a calculated error value. In other words, a smaller error value refers to higher accuracy, and a larger error value refers to lower accuracy. An error value or accuracy is compared with a target value (e.g., a target error value or target accuracy) to determine whether to proceed with a correction process.

As an example, whether to perform a correction process may be determined through whether an error value for each spot falls within a target value range. Equation 5 shows a corresponding process.

$$\theta_{S_1} = \begin{cases} 1, \varepsilon_{S_1} \le E_{target} \\ 0, \text{otherwise} \end{cases}, S_i \in SPOT \qquad \text{Equation 5}$$

In Equation 5, $q_{Si}$ is set to a value of 1 or 0 according to whether an error value ($e_{Si}$) at a corresponding spot Si is within a target value ($E_{target}$) range. When an error value for all spots is within a target value range, i.e., when a value of $q_{Si}$ for all spots is 1, selected route data may be determined as final route data without performing a correction process. Equation 6 shows a condition that a correction process for selected route data is not performed.

$$\sum_{S_i \in SPOT} \theta_{S_i} = n(SPOT) \qquad \text{Equation 6}$$

As in an example shown in Equation 6, when the sum of $q_{Si}$ for all spots is the same as the number of spots, a correction process may not be performed.

When a condition in Equation 6 is not satisfied, information for reselection of route data is fed back to the previous step. The information may be for adjusting a hyperparameter used in the previous step.

Hyperparameter adjustment for reducing an error value may adjust a spatiotemporal traffic flow pattern value applied in the previous step based on a simulation traffic flow difference value ($d_{Si}$) compared to an actually observed traffic flow for each spot.

Equation 7 shows an example in which a spatiotemporal traffic flow pattern value is adjusted.

$$\overline{w_{S_i}}(t) = \beta \cdot \overline{w_{S_i}}(t-1),\ \beta \propto \delta_{S_i},\ S_i \in SPOT \qquad \text{Equation 7}$$
$$\delta_{S_i} = v_{sim} - v_{real}$$

Equation 7 illustrated that a spatiotemporal traffic flow pattern value is adjusted based on a weight b. In this case, a weight b is expressed as a value proportional to a traffic flow difference value $d_{Si}$, and may have a value greater than or equal to 0. Meanwhile, when $d_{Si}$ has a negative value, a weight b may be set to a value between 0 and 1. In other words, when $d_{Si}$ has a negative value, correction may be performed so that a spatiotemporal traffic flow pattern value for a target spot decreases. On the other hand, when $d_{Si}$ has a positive value, a weight b may be set to a value greater than 1. In other words, when $d_{Si}$ has a positive value, correction may be performed so that a spatiotemporal traffic flow pattern value for a target spot increases. An increase or a decrease in a spatiotemporal traffic flow pattern value affects an increase or a decrease in the number of sampled route data and accordingly, results in allocating different route data than before.

Meanwhile, adjustment for a spatiotemporal traffic flow pattern value may be processed in parallel for each spot. New route data may be obtained by re-performing a route data sampling process based on an adjusted spatiotemporal traffic flow pattern value.

Meanwhile, as information for adjusting a hyperparameter, a traffic flow difference value or a weight value may be fed back to the previous step or an adjusted spatiotemporal traffic flow pattern value may be fed back to the previous step.

A correction process may also be performed through artificial intelligence learning such as reinforcement learning.

Furthermore, a step of determining route data and performing correction therefor may be repeatedly performed until accuracy for each spot satisfies a target value.

Figure 7:
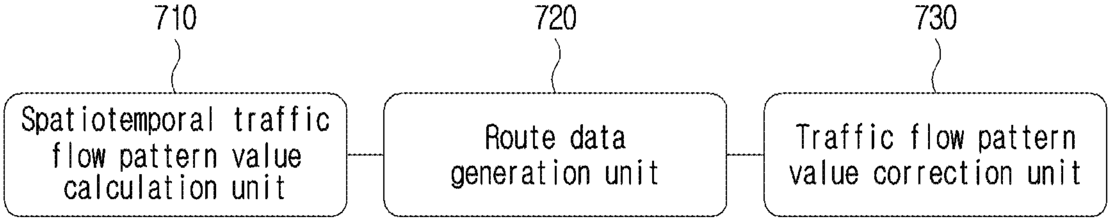
FIG. 7 is a block diagram of a device that performs a method for generating and correcting traffic demand according to the present disclosure.

FIG. 7 is a block diagram of a device that performs a method for generating and correcting traffic demand according to the present disclosure.

Referring to FIG. 7, a device may include at least one of a spatiotemporal traffic flow pattern value calculation unit (710), a route data generation unit (720) and a traffic flow pattern value correction unit (730).

A spatiotemporal traffic flow pattern value calculation unit (710) calculates a spatiotemporal traffic flow pattern value based on actually observed/estimated traffic data. Since a process of calculating a spatiotemporal traffic flow pattern value has been described in detail, a detailed description thereof is omitted.

A route data generation unit (720) selects route data from a route data pool based on a spatiotemporal traffic flow pattern value. Specifically, route data may be selected from a route data pool through weighted random sampling by utilizing a spatiotemporal traffic flow pattern value as weight information.

A traffic flow pattern value correction unit (730) performs traffic simulation on route data generated in a route data generation unit and compares a traffic flow value for an actual observation spot on traffic simulation with an actual traffic flow value at an actual observation spot to determine whether to correct a spatiotemporal traffic flow pattern value.

When it is determined that correction for a spatiotemporal traffic flow pattern value is required, a traffic flow pattern value correction unit (730) gives feedback on information for correcting a spatiotemporal traffic flow pattern value to a route data generation unit (720). In this case, a route data generation unit (720) may update a spatiotemporal traffic flow pattern value based on received information and reselect route data based on an updated spatiotemporal traffic flow pattern value.

According to the present disclosure, there is an effect of utilizing public traffic data and private traffic data to calculate spatiotemporal traffic flow patterns within a road network and providing traffic demand data (i.e., route data)

suitable for traffic simulation which is part of a traffic prediction system based thereon.

According to the present disclosure, there is an effect of improving the accuracy of traffic demand data by comparing the results of traffic simulation with actually observed data.

Effects achievable by the present disclosure are not limited to the above-described effects, and other effects which are not described herein may be clearly understood by those skilled in the pertinent art from the following description.

A component described in illustrative embodiments of the present disclosure may be implemented by a hardware element. For example, the hardware element may include at least one of a digital signal processor (DSP), a processor, a controller, an application-specific integrated circuit (ASIC), a programmable logic element such as a FPGA, a GPU, other electronic device, or a combination thereof. At least some of functions or processes described in illustrative embodiments of the present disclosure may be implemented by a software and a software may be recorded in a recording medium. A component, a function and a process described in illustrative embodiments may be implemented by a combination of a hardware and a software.

A method according to an embodiment of the present disclosure may be implemented by a program which may be performed by a computer and the computer program may be recorded in a variety of recording media such as a magnetic Storage medium, an optical readout medium, a digital storage medium, etc.

A variety of technologies described in the present disclosure may be implemented by a digital electronic circuit, a computer hardware, a firmware, a software or a combination thereof. The technologies may be implemented by a computer program product, i.e., a computer program tangibly implemented on an information medium or a computer program processed by a computer program (e.g., a machine readable storage device (e.g.: a computer readable medium) or a data processing device) or a data processing device or implemented by a signal propagated to operate a data processing device (e.g., a programmable processor, a computer or a plurality of computers).

Computer program(s) may be written in any form of a programming language including a compiled language or an interpreted language and may be distributed in any form including a stand-alone program or module, a component, a subroutine, or other unit suitable for use in a computing environment. A computer program may be performed by one computer or a plurality of computers which are spread in one site or multiple sites and are interconnected by a communication network.

An example of a processor suitable for executing a computer program includes a general-purpose and special-purpose microprocessor and one or more processors of a digital computer. Generally, a processor receives an instruction and data in a read-only memory or a random access memory or both of them. A component of a computer may include at least one processor for executing an instruction and at least one memory device for storing an instruction and data. In addition, a computer may include one or more mass storage devices for storing data, e.g., a magnetic disk, a magnet-optical disk or an optical disk, or may be connected to the mass storage device to receive and/or transmit data. An example of an information medium suitable for implementing a computer program instruction and data includes a semiconductor memory device (e.g., a magnetic medium such as a hard disk, a floppy disk and a magnetic tape), an optical medium such as a compact disk read-only memory (CD-ROM), a digital video disk (DVD), etc., a magnet-optical medium such as a floptical disk, and a ROM (Read Only Memory), a RAM (Random Access Memory), a flash memory, an EPROM (Erasable Programmable ROM), an EEPROM (Electrically Erasable Programmable ROM) and other known computer readable medium. A processor and a memory may be complemented or integrated by a special-purpose logic circuit.

A processor may execute an operating system (OS) and one or more software applications executed in an OS. A processor device may also respond to software execution to access, store, manipulate, process and generate data. For simplicity, a processor device is described in the singular, but those skilled in the art may understand that a processor device may include a plurality of processing elements and/or various types of processing elements. For example, a processor device may include a plurality of processors or a processor and a controller. In addition, it may configure a different processing structure like parallel processors. In addition, a computer readable medium means all media which may be accessed by a computer and may include both a computer storage medium and a transmission medium.

The present disclosure includes detailed description of various detailed implementation examples, but it should be understood that those details do not limit a scope of claims or an invention proposed in the present disclosure and they describe features of a specific illustrative embodiment.

Features which are individually described in illustrative embodiments of the present disclosure may be implemented by a single illustrative embodiment. Conversely, a variety of features described regarding a single illustrative embodiment in the present disclosure may be implemented by a combination or a proper sub-combination of a plurality of illustrative embodiments. Further, in the present disclosure, the features may be operated by a specific combination and may be described as the combination is initially claimed, but in some cases, one or more features may be excluded from a claimed combination or a claimed combination may be changed in a form of a sub-combination or a modified sub-combination.

Likewise, although an operation is described in specific order in a drawing, it should not be understood that it is necessary to execute operations in specific turn or order or it is necessary to perform all operations in order to achieve a desired result. In a specific case, multitasking and parallel processing may be useful. In addition, it should not be understood that a variety of device components should be separated in illustrative embodiments of all embodiments and the above-described program component and device may be packaged into a single software product or multiple software products.

Illustrative embodiments disclosed herein are just illustrative and do not limit a scope of the present disclosure. Those skilled in the art may recognize that illustrative embodiments may be variously modified without departing from a claim and a spirit and a scope of its equivalent. Accordingly, the present disclosure includes all other replacements, modifications and changes belonging to the following claim.

DESCRIPTION OF SIGNS

710: Spatiotemporal Traffic Flow Pattern Value Calculation Unit
720: Route Data Generation Unit
730: Traffic Flow Pattern Value Correction Unit

What is claimed is:

1. A computer-implemented method for correcting traffic demand-related route data for a road-network traffic simulation, the method comprising:

calculating, from actually observed traffic data and estimated traffic data for a road network graph, a spatiotemporal traffic flow pattern value by spatially combining temporal traffic flow pattern values for traffic data collection spots;

selecting, from a route data pool comprising trajectory route data and road network-based route data, at least one route data from the route data pool based on the spatiotemporal traffic flow pattern value, wherein the at least one route data is selected by weighted random sampling using the spatiotemporal traffic flow pattern value as weight information and wherein the road network-based route data is obtained by applying a route generation algorithm to the road network data;

generating final route data by allocating a vehicle departure time to the selected at least one road data;

performing a traffic simulation based on the selected route data including the final route data;

determining whether to correct the spatiotemporal traffic flow pattern value based on a result of the traffic simulation; and extracting, from the result of the traffic simulation, a first traffic flow value at an actual observation spot.

2. The method of claim 1, wherein:

the vehicle departure time is determined based on a spatiotemporal occurrence distribution of trajectory route data.

3. The method of claim 1, wherein:

whether to correct the spatiotemporal traffic flow pattern value is determined based on whether an error between a first traffic flow value at an actual observation spot obtained through the traffic simulation and a second traffic flow value actually observed at the actual observation spot is less than or equal to a target value, and when the error is greater than the target value, generating correction information including a difference between the first traffic flow value and the second traffic flow value or a weight derived based on the difference, updating the spatiotemporal traffic flow pattern value based on the correction information, and causing reselection of route data based on the updated spatiotemporal traffic flow pattern value.

4. The method of claim 1, wherein:

when it is determined to correct the spatiotemporal traffic flow pattern value, information for correcting the spatiotemporal traffic flow pattern value is fed back to a route data selection step.

5. The method of claim 4, wherein:

the information includes at least one of a difference between the first traffic flow value and the second traffic flow value, or a weight derived based on the difference.

6. The method of claim 5, wherein:

the weight is proportional to the difference.

7. The method of claim 6, wherein:

when the difference is a negative value, the weight is set to a value between 0 and 1, when the difference is a positive value, the weight is set to a value greater than 1.

8. The method of claim 5, wherein:

a corrected spatiotemporal traffic flow pattern value is derived by multiplying the spatiotemporal traffic flow pattern value by the weight.

9. The method of claim 1, wherein:

the at least one route data is selected by sampling route data from the route data pool based on a weight based on the spatiotemporal traffic flow pattern value.

10. A device for correcting traffic demand-related route data for a road-network traffic simulation, the device comprising:

one or more processors; and a memory storing instructions that, when executed by the one or more processors, cause the one or more processors to:

calculate a spatiotemporal traffic flow pattern value from actually observed traffic data and estimated traffic data for a road network graph, wherein the spatiotemporal traffic flow pattern value is generated by spatially combining temporal traffic flow pattern values for traffic data collection spots;

select at least one route data from a route data pool based on the spatiotemporal traffic flow pattern value, wherein the route data pool comprises trajectory route data and road network-based route data, wherein the road network-based route data is obtained by applying a route generation algorithm to road network data, wherein the at least one route data is selected by weighted random sampling using the spatiotemporal traffic flow pattern value as weight information, and wherein final route data is generated by allocating a vehicle departure time to the selected at least one route data; and perform a traffic simulation based on the selected route data, and determining whether to correct the spatiotemporal traffic flow pattern value based on a result of the traffic simulation by extracting, from the result of the traffic simulation, a first traffic flow value at an actual observation spot, determining whether an error between the first traffic flow value and a second traffic flow value actually observed at the actual observation spot is less than or equal to a target value.

11. The device of claim 10, wherein:

the vehicle departure time is determined based on a spatiotemporal occurrence distribution of trajectory route data.

12. The device of claim 10, wherein:

whether to correct the spatiotemporal traffic flow pattern value is determined based on whether an error between a first traffic flow value at an actual observation spot obtained through the traffic simulation and a second traffic flow value actually observed at the actual observation spot is less than or equal to a target value, and, when the error is greater than the target value, generating correction information including a difference between the first traffic flow value and the second traffic flow value or a weight derived based on the difference, updating the spatiotemporal traffic flow pattern value based on the correction information, and causing reselection of route data based on the updated spatiotemporal traffic flow pattern value.

13. The device of claim 10, wherein:

when it is determined to correct the spatiotemporal traffic flow pattern value, information for correcting the spatiotemporal traffic flow pattern value is fed back to a route data selection unit.

14. The device of claim 13, wherein:

the information includes at least one of a difference between the first traffic flow value and the second traffic flow value, or a weight derived based on the difference.

* * * * *